May 29, 1962 W. VALI 3,036,458
METHOD AND MEANS FOR MEASURING STRAIN IN MATERIALS
Filed Sept. 24, 1957

INVENTOR
WALTER VALI

BY *Robert L. Gunn*
ATTORNEY

United States Patent Office 3,036,458
Patented May 29, 1962

3,036,458
METHOD AND MEANS FOR MEASURING STRAIN IN MATERIALS
Walter Vali, Palo Alto, Calif., assignor to Industrial Physics, Inc., Palo Alto, Calif., a corporation of Maryland
Filed Sept. 24, 1957, Ser. No. 685,965
9 Claims. (Cl. 73—88.5)

This invention relates to strain measuring devices and deals with a method and a means for measuring strain in materials and structures that will automatically compensate for temperature and temperature variations and will deliver reliable results without additional compensating devices or calculated adjustments.

Briefly stated, the method consists in setting up stress in thermocouples commensurate with stress in the work to be tested and measuring the net E.M.F. generated by the thermocouples to indicate the strain in the work.

The preferred means for practicing my invention consists of a pair of thermocouples, identical in form and composition, and according to my method, makes use of the fact that when the junction of the two materials forming a thermocouple is put under stress, an E.M.F. generated by the juncture is changed and the change depends on the materials used and the stress imposed. Furthermore, the direction in which the stress is imposed determines the direction of flow and the magnitude of the generated E.M.F. Therefore, since the metals are the same and the temperature thereof equal, and only the stress is variable, it follows that the E.M.F. generated is a true indication of the stress imposed.

The instantaneous thermoelectric power generated by a thermocouple may be expressed as $$\frac{dE}{dT} = A + Bt + \ldots$$

where T is absolute temperature, $t$ is temperature differential between hot and cold junctions, and the parameters A and B etc. depend on the materials used and the stress imposed on the juncture of the two materials, e.g., metals, semi-conductors, etc. The above becomes $$E = AT + \frac{1}{2}BT^2 + \ldots$$

for expressions of voltage. Here it can be shown that the parameters A, B, etc. are functions of stress and may be used to measure stress in materials and structures. Earlier recognition and more detailed theoretical considerations with respect to stress induced changes in thermal electromotive force may be found in an article by P. W. Bridgman in the Proceedings of the American Academy of Arts and Sciences, at Vol. 53, beginning at page 269, and also in the text entitled "Textbook of Thermodynamics," by Paul S. Epstein, at page 273, published by John Wiley and Sons, N.Y., N.Y. (1937).

In one form of my invention, I contemplate using a pair of thermocouples to derive the several different results to be explained. For example, if measurement of directional stress is sought, two identical thermocouples are attached to the work under test with the plane of the thermocouple junctions at right angles to each other. Then if stress is applied at right angles to one of the thermocouple junctures and parallel to the other, the junctions are subjected to the maximum difference in stress thus producing a deformation in one junction with a resultant E.M.F. while both are at the same temperature. Under no stress, the thermal E.M.F.'s generated by the two thermocouples would be equal in measurement, hence the temperature factor automatically cancels out and the net result is a direct indication of the stress imposed. This is true because the potentials generated in the thermocouples cancel regardless of the materials used in the thermocouples.

Again, if a non-directional reading in a material or structure is required, it may be obtained by attaching one thermocouple to the structure under test while the other is kept free. In this case, both thermocouples must be kept at the same temperature during the test. Other combinations and uses will become obvious to those skilled in the art.

In the drawing I have shown a specific application of my invention for purposes of illustration only and as the description proceeds other objects and uses will appear.

Figure 1:
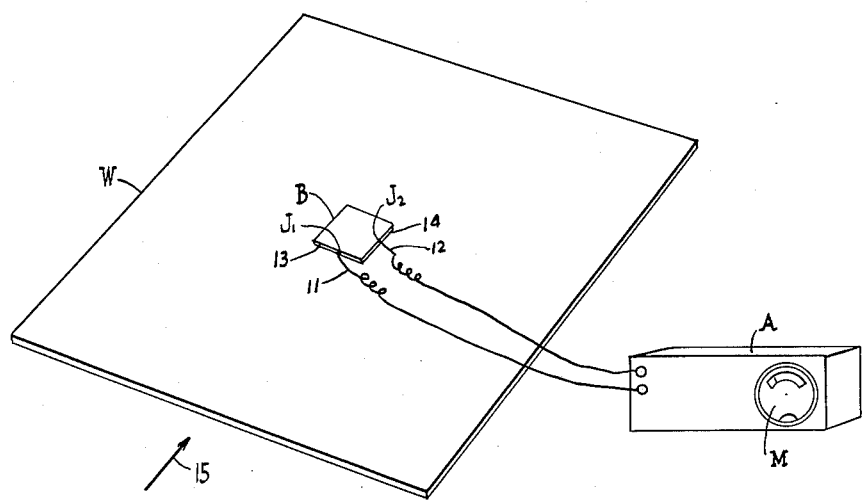
FIG. 1 is a schematic showing one way of using my invention to determine stress in a material or structure.

Referring to the drawing, it can be seen that I have shown several forms which my invention may take. It is to be understood, however, that there are other forms which have not been shown and will not be discussed. This disclosure, therefore, is intended to cover all such forms of this invention as come within the scope of the disclosure and the purview of the appended claims.

Figure 2:
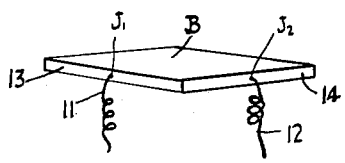
FIG. 2 is an enlarged view showing one form which my invention may take.

In FIG. 2, I have shown a combined unit, that is, a pair of thermocouples embodied in a single block B with leads 11 and 12 coming off faces 13 and 14 respectively. It should be understood that the faces 13 and 14 which will hereinafter be termed the junction faces are at right angles to each other and that the thickness of the block B is not of importance, the only requirement being that it is large enough to provide faces suitable for attaching the conductors 11 and 12 thereto and capable of being attached to the work or structure to be tested.

In FIG. 1, I have shown how my invention may be used to measure stress in material, which could be a part of any structure. In this view, the block B is attached to the structure or work piece W to be tested and the leads 11 and 12 forming junctions $J_1$ and $J_2$ respectively are connected to a voltage amplifier A having a voltmeter M arranged to be operated by the output from the amplifier. The block B is attached to the work or structure W in any suitable manner such as by welding, soldering, cementing, depending on the circumstances surrounding the test with respect to temperature, amount of strain, etc. Without any strain being applied to the work, the E.M.F.'s generated at the junctions $J_1$ and $J_2$ are equal and opposite as explained hereinbefore.

When stress is applied to the structure in the direction of the arrow 15, it will be noted that the direction of stress aligns with the face 14 and is substantially at right angles to the face 13. This results in a change in the E.M.F.'s in both wires 11 and 12 so that they are no longer in balance. Strictly speaking, this is true. Along with the major deformation of junction $J_2$, there is a slight deformation of junction $J_1$ due solely to finite size of the junction, which produces an E.M.F. in conductor 11. But this E.M.F. is extremely small compared to the E.M.F. generated at junction $J_2$. Any E.M.F. generated by temperature or temperature variations is the same in both leads and automatically cancels out, therefore, any reading shown on the meter M would be a resultant E.M.F. of the junctions $J_1$ and $J_2$ and would be a true indication of the stress imposed.

Figure 3:
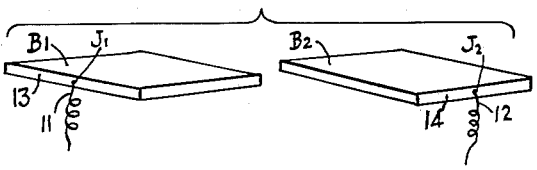
FIG. 3 shows another form of my invention.
Figure 4:
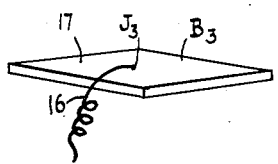
FIG. 4 shows still another form of the invention.

The same test could be made with two separate thermocouples shown in FIG. 3 by mounting them separately on the work W at right angles to each other, using the same amplifier. For instance, unit $B_1$ could be attached to the work W in any suitable manner and unit $B_2$ could likewise be attached to the work with the junction faces 13 and 14 at right angles to each other. In other respects the operation is the same. The advantage here is a single unit construction, useful in several ways. Or if a non-directional strain test were required, it could be made by attaching to the work a thermocouple unit $B_3$ having a conductor 16 coupled to the face 17 forming a thermocouple junction $J_3$, shown in FIG. 4, and keeping another similar unit free from stress but exposed to the same temperature, again using the same amplifier. Other combinations and uses will become obvious to those working in the fields where strain measurements are required.

Wherever E.M.F. is used throughout the specification and claims it is to be understood to be an abbreviation for electromotive force, commonly used in text books and technical language.

Suitable materials for thermocouples as defined in the specification and claims include materials such as metal to metal, metal to semi-conductor, and semi-conductor to semi-conductor. Suitable materials also means choice of thermocouple consistent with temperature requirements of strain gage where such requirements are defined by the temperature of the structure in which strains are to be measured.

I claim:

1. A method of measuring strain in a material, comprising orienting two thermocouples perpendicularly to each other in a junction block attached to the material to be tested, electrically connecting said thermocouples in opposition to one another, establishing directional stress in said junction block and consequently in each thermocouple commensurate with the directional strain in said material while maintaining said thermocouples at the same temperature, and measuring the net stress induced electromotive force generated in said thermocouples to provide an indication of the extent of directional stress applied to said material.

2. A strain gage comprising an even plurality of thermocouples of suitable material arranged so as to be at relatively the same temperature and electrically connected together in opposition to produce a change in the electromotive force generated across said thermocouples when such are subjected to stress, said thermocouples being affixed to a structure in non-aligned relation to one another to cause directionl deformation of said thermocouples commensurate with the stress induced directional deformation of said structure, and means measuring the deformation induced change in net electromotive force across said thermocouples.

3. In combination with a material subjectable to stress, stress measuring means comprising a thermocouple junction block attached to said material, a plurality of like thermocouple junctions arranged with said junction block so as to be at the same temperature as said block and also so as to be sensitive to directional stresses applied to said block, and means detecting the net electromotive force output generated at said thermocouple junctions to provide an indication of the extent of such stresses, the interconnection of said thermocouple junctions through said junction block substantially canceling from said output the thermally induced electromotive force generated at said junctions.

4. The combination of claim 3, wherein the junctured thermocouple components are metallic.

5. The combination of claim 3, wherein at least one of each pair of junctured thermocouple components is a semi-conductor.

6. The combination of claim 5, wherein said junction block is a semi-conductor, wherein the thermocouple components junctured thereto are metallic, and wherein said detecting means comprises a voltmeter measuring the output voltage between said metallic thermocouple components.

7. A thermocouple circuit arrangement for measuring strain in an electroconductive material by substantially canceling thermally induced electromotive force effects and isolating stress induced electromotive force effects for measurement of the latter, comprising two like thermocouple junctions electrically interconnected through said material in opposition and maintained at substantially equal temperature, and means detecting the net electromotive force generated across the non-interconnected output thermocouple components.

8. The thermocouple arrangement of claim 7, wherein said thermocouple junctions are arranged substantially in a common plane and substantially perpendicular to each other, to each be selectively sensitive to directional stresses exerted in the direction of one dimensional axis of said plane but not the other.

9. Means for detecting mechanical deformation of a material under stress, comprising a thermocouple assembly attached to said material, said assembly including two thermocouple junctions with a common, interconnecting component attached to said material and with like output components, all said components being maintained at substantially the same temperature to substantially cancel the thermally induced electromotive force from the output of said assembly, such output thereby providing an indication of mechanical deformation occurring at the thermocouple junctions, and means measuring such output to provide a proportional indication of the occurrence of such deformation.

References Cited in the file of this patent

UNITED STATES PATENTS

| 1,680,589 | Bock | Aug. 14, 1928 |
| 2,592,223 | Williams | Apr. 8, 1952 |
| 2,621,276 | Howland | Dec. 9, 1952 |
| 2,672,048 | Ruge | Mar. 16, 1954 |